(12) United States Patent
Miyata (10) Patent No.: US 6,234,789 B1
(45) Date of Patent: May 22, 2001

(54) INTER-SWITCHING HEAT ACCUMULATING REGENERATIVE BURNER SYSTEM

(75) Inventor: Makoto Miyata, Yokohama (JP)

(73) Assignee: Nippon Furnace Kogyo Kabushiki Kaisha, Kanagwa (JP)

( * ) Notice: Subject to any disclaimer, the term of this patent is extended or adjusted under 35 U.S.C. 154(b) by 0 days.

(21) Appl. No.: 09/508,933
(22) PCT Filed: Sep. 25, 1998
(86) PCT No.: PCT/JP98/04311
§ 371 Date: Mar. 17, 2000
§ 102(e) Date: Mar. 17, 2000
(87) PCT Pub. No.: WO99/17060
PCT Pub. Date: Apr. 8, 1999

(30) Foreign Application Priority Data

Sep. 26, 1997 (JP) .................................................. 9-262506

(51) Int. Cl.[7] ....................................................... F27D 17/00
(52) U.S. Cl. ........................... 432/180; 431/215; 126/91 A
(58) Field of Search .................................... 432/179, 180, 432/181; 431/11, 215; 126/91 A (56) References Cited

U.S. PATENT DOCUMENTS

| | | | |
|---|---|---|---|
| 3,894,834 | * 7/1975 | Estes | 431/12 |
| 4,943,231 | * 7/1990 | Jenkins et al. | 432/180 |
| 5,456,216 | * 10/1995 | Kaji et al. | 432/181 |
| 6,071,116 | * 6/2000 | Philippe et al. | 431/215 |

* cited by examiner

Primary Examiner—Gregory Wilson
(74) Attorney, Agent, or Firm—Notaro & Michalos P.C.

(57) ABSTRACT

The present invention provides an alternate changeover regenerative burner system suitable for use as a heat source for an industrial furnace and the like where re-increase in temperature is relatively-often carried out; an alternate changeover regenerative burner constituted by a burner 2 having a regenerator 7 and air supply/exhaust switching mechanisms 12 and 13 for switching connection with an air supply system 17 and an exhaust system 16 of the burner 2 is regarded as a module unit; and three or more units of the alternate changeover regenerative burner constitute a combustion system 1; a ratio of the number of the burners 2 performing combustion and the number of the burners 2 being stopped is variable; and combustion is controlled in such a manner that all the units sequentially repeat alternate regenerative combustion with the units forming no fixed pairs. According to the present invention, a flow velocity of air injected from a burner throat can be variable irrespective of a quantity of combustion; the flow velocity of air emitted from the burner throat can be maintained high even if the operation is carried out with a quantity of combustion lower than the burner capacity; and a non-stationary flame can be formed in a wider range.

19 Claims, 8 Drawing Sheets

INTER-SWITCHING HEAT ACCUMULATING REGENERATIVE BURNER SYSTEM

FIELD OF THE INVENTION

The present invention relates to an alternate changeover regenerative burner system. More particularly, the present invention relates to an alternate changeover regenerative burner system suitable as a heat source for an industrial furnace and others in which re-increase in temperature is relatively often performed.

DESCRIPTION OF THE PRIOR ART

A prior art alternate changeover regenerative burner system comprises: a pair of burners each of which has a regenerator; and air supply/exhaust switching means for switching supply and exhaust of oxidizer such as air, oxygen-enriched air, pure oxygen and others (which will be simply referred to as combustion air in this specification) between this pair of burners, and the system alternately burns the pair of burners (the currently-burning burner will be referred to as a burner performing combustion) and exhausts gas in a furnace from a non-combusting burner (which will be referred to as a burner performing exhaust) to recollect heat of the exhaust gas from the regenerator so that the heat can be used for preheating the next combustion air. In this alternate changeover regenerative burner system, multiple systems are usually provided to an industrial furnace, namely, burners whose number is a multiple number of 2 are provided, and the half of the burners is alternately burned. The remaining half of the burners is used as burners performing exhaust from which the furnace gas is exhausted.

Meanwhile, in a furnace in which re-increase in temperature is often performed, for example, once a day, once a week and the like, a capacity of the burner is generally determined on the basis of a quantity of combustion in case of the rapid increase in temperature for improving the operation ratio. This is also true in the industrial furnace having the alternate changeover regenerative burners, and the operation is performed with a low quantity of combustion as compared with the capacity of the burner in the actual operation.

However, since a ratio of the number of burners performing combustion to the number of burners being stopped is always fixed and these numbers forms a rigid pair, although a non-stationary flame is formed, a flame only shifts between the pair of burners. Therefore, there is a limit in formation of the non-stationary flame, and such a formation may not be sufficient in some cases.

Further, since a total quantity of combustion of the burners becomes equal in the warm-up operation and in the subsequent operation (operation after the furnace temperature has reached a predetermined temperature), the high air velocity can not be maintained in the operation as a quantity of combustion is low as compared with the burner capacity, and agitation of the furnace gas having the low density of oxygen and entrainment of the furnace gas can not be satisfactorily active. This causes the furnace atmosphere having differences in temperatures at some places to be formed (the distribution of the furnace temperatures is not sufficiently smoothed), leading to such a tendency as that a region, in which a furnace temperature is locally high, is formed to increase an amount of generation of NOx. On the other hand, when designing the system so as to increase the air flow velocity in the high furnace atmosphere in the rated operation for reducing NOx, a low amount of generation of NOx can be maintained, but the temperature-up velocity is obliged to slow down because the capacity of combustion during the increase in the temperature can not be set high. As a countermeasure for avoiding inconsistency of the NOx reduction during the rapid increase in temperature and in the rated operation, a part of burners may be suspended, but there occur other problems such as protection of the burner suspended in the rated operation from the overheat and unevenness of the furnace temperature due to space or absence of a part of burners. As another measure for avoiding the inconsistency, changes in size or number of air nozzles can be considered, but a valve mechanism which opens and closes in a high-temperature portion is required, and hence this is practically difficult.

It is therefore an object of the present invention to provide an alternate changeover regenerative burner system capable of maintaining a high flow velocity of air belching from a burner throat even if operating with a quantity of combustion lower than a capacity of burner. It is another object of the present invention to provide an alternate changeover regenerative burner system by which a flow velocity of air belching from a burner throat is variable irrespective of changes in a quantity of combustion. It is a further object of the present invention to provide an alternate changeover regenerative burner system capable of forming a non-stationary flame in a wide range.

DISCLOSURE OF THE INVENTION

To achieve this aim, in an alternate changeover regenerative burner system according to the present invention, in a burner system which operates with a quantity of combustion during the rated operation after increasing a temperature reduced to be smaller than that during the warm-up operation, three or more units of alternate changeover regenerative burner, which is regarded as a module unit and composed of a burner having a regenerator and an air supply/exhaust switching device for switching connection to an air supply system and an exhaust system of the burner, constitute a combustion system, and the all units sequentially repeat alternate regenerative combustion without forming fixed pairs of units; a ratio of the number of burners performing combustion and the number of burners performing exhaust is variable depending on the warm-up operation for increasing a furnace temperature and the operation after increasing the temperature; and the operation after increasing the temperature is carried out with the burners performing combustion whose number is smaller than that of the burners performing combustion during the warm-up operation. Here, it is preferable that the relationship between the number of the burners performing combustion and the number of the burners performing exhaust is such that the number of the burners performing combustion is equal to or larger than the number of the burners performing exhaust during the warm-up operation and the number of the burners performing exhaust is larger than the number of the burners performing combustion during the rated operation after increasing the temperature, and it is also preferable that the number of the burner units are set to five or more units and the number of the burners performing combustion is slightly smaller than the number of the burners performing exhaust during the warm-up operation while the number of the burners performing combustion is greatly smaller than the number of the burners performing exhaust during the rated operation after increasing the temperature. Even if the burners performing combustion differ from the regenerative burners in number. The relationship between a quantity of air supply and that of exhaust does not vary even if the burners performing combustion differ from the regenerative burners in number. That is, even if a ratio of number of the burners performing combustion and that of the burners performing exhaust is 1:1 or 1:2, both a quantity of air flow and a quantity of exhaust do not change in terms of a single step. However, if the ratio of the burners performing combustion is reduced, the ratio of the air time is also reduced by just that much, and a fluid velocity flowing through the regenerator is high in case of air while the same is low in case of exhaust. Heat transfer for cooling is enhanced, and hence the efficiency of the regenerator tends to be improved. In other words, a temperature of heating air becomes high while a temperature of exhaust is lowered.

Therefore, when operating with a quantity of combustion smaller than the burner capacity, after increasing the temperature, a flow velocity of air injected from a burner throat of each burner can be maintained high by reducing the number of the burners performing combustion. Thus, the circulation of the combustion gas in the combustion chamber becomes active and is well agitated to smooth the furnace temperature in the combustion chamber, and a quantity of the combustion gas associated with a flow of the combustion air is increased to greatly reduce a density of oxygen in the air-fuel mixture. Further, since the temperature can be increased with a maximum quantity of combustion when starting up the furnace, the operation can be started up in a minimum time. Moreover, since the burners of all the units perform combustion at staggered times, a non-stationary flame can be formed in a wider area, thereby forming a flat temperature distribution with generation of a local high-temperature area being suppressed. Additionally, since the high jet velocity of combustion air can be maintained and the burners of all the units perform combustion at staggered times in the bargain, the flow of the furnace gas changes in a short period of time to be active, thereby forming a flat temperature distribution with generation of a local high-temperature area being suppressed. Therefore, partial heating relative to a workpiece is eliminated to enable uniform heating, and generation of NOx can be further suppressed.

Moreover, the velocity of fluid flowing through the regenerator is high when the fluid is air while the same is low when the fluid is exhaust gas, and hence heat transfer for cooling is improved, thus enhancing the efficiency of the regenerator. In addition, even if a quantity of combustion does not change, the velocity of combustion air and the like belching from the burner throat can vary in accordance with increase/decrease in number of burners performing combustion. Consequently, the high velocity of air can be maintained, and hence high velocity of air can be maintained to suppress NOx even if the burner requiring a temporarily-high quantity of combustion is subjected to the rated operation by lowering a quantity of combustion. Further, continuous or intermittent flow of the cooling fluid to a pilot or a fuel nozzle hardly generates the overheated burnout.

In the burner system according to the present invention, it is preferable that a ratio of the number of burners performing combustion and the number of burners being stopped in the combustion system is determined to be variable in accordance with a fluctuation of a quantity of combustion. In this case, even if quantities of combustion as the furnace are the same, the velocity of combustion air belching from the burner throat or the velocity of the combustion gas (these will be generically referred to as an air velocity) can vary in accordance with increase/decrease in number of burners performing combustion. Accordingly, reduction in number of burners performing combustion can maintain the high air velocity, and flow of the furnace gas can be active, thereby forming a flat temperature distribution with generation of a locally-high temperature area being suppressed. Further, in cases where a quantity of combustion is lowered by reducing the number of burners performing combustion, the power of an exhaust fan can be lowered by reducing exhaust pressure losses. Particularly, when a difference between the burners performing combustion and the burners performing exhaust is extremely enlarged, a range of a non-stationary flame can be extended while the exhaust is enabled by the natural draft using a blower and a stack, thereby omitting an exhaust blower.

Therefore, in the furnace to which the burner system according to the present invention is applied, since a furnace temperature can be formed in a flat temperature distribution by which a locally-high temperature portion can not be generated, uniform heating is possible without partial heating relative to a workpiece and generation of NOx can be further suppressed.

In addition, in the burner system according to the present invention, three or more units of alternate changeover regenerative burner for constituting a combustion system comprising a burner having a regenerator and an air supply/exhaust switching device for switching connection to an air supply system and an exhaust system of the burner and the alternate regenerative burner is regarded as a module unit, and combustion air which is preheated to a high temperature not less than at least a stable combustion limit temperature of an air-fuel mixture immediately before combustion through the regenerator is supplied so that all the units sequentially repeat the alternate regenerative combustion with the units forming no fixed pairs. In this case, formation of a non-stationary flame in a wider range and an active flow of the furnace gas due to a high-speed jet flow of air can suppress generation of a local high-temperature area, thereby reducing NOx.

Additionally, in the burner system according to the present invention, it is preferable that the exhaust gas sequentially discharged from all the units is set in a range of 1.2 to 0.6 provided that the combustion air is 1. In such a case, the preferable regenerative combustion can be realized.

Further, in the burner system according to the present invention, the exhaust gas is partially taken to the outside of the furnace directly without passing through the burner performing exhaust and mixed with the exhaust gas cooled down via the regenerator of the burner performing exhaust to be thereafter exhausted. In this case, an exhaust temperature can be further reduced.

Moreover, in the burner system according to the present invention, the combustion air supplied via the regenerator is preheated to a high temperature not less than at least a stable combustion limit temperature of the air-fuel mixture immediately before combustion. Therefore, since oxidative exothermal reaction starts in a position where the combustion air having a high temperature not less than a self-ignition temperature of the air-fuel mixture and a low density of oxygen establishes contact with the fuel, the speed of the oxidative exothermal reaction becomes extremely low and combustion occurs all over the place in the furnace. Thus, a locally-high temperature area is not formed in the furnace temperature distribution and generation of NOx is restrained.

Furthermore, in the burner system according to the present invention, the combustion air belches at a flow rate not less than 60 m/s, or more preferably, approximately 60 to 120 m/s during the rated operation of combustion. In this case, circulation of the combustion gas in the furnace is active and well agitated to provide a uniform furnace temperature, and further uniform heating can be realized while reducing partial heating relative to a workpiece. Also, agitation of gas in the furnace enhances the effect of recirculation of the exhaust gas, and reduction in density of oxygen can decrease NOx.

Additionally, in the burner system according to the present invention, although the air supply/exhaust switching device is not restricted to a specific type, it is preferable that the air supply/exhaust switching device has, e.g., a three-way valve function by which the air supply system and the exhaust system are always connected and the remaining one port is connected to each burner unit including the regenerator. In such a case, since the burners in all the units carry out combustion at staggered times with a minimum purge time for switching, alternate combustion can be achieved while forming a non-stationary flame in a wide range. Thus, realization of a non-stationary flame is further advanced as compared with the above-described alternate combustion burner system, and the furnace temperature distribution can be further uniformized.

Moreover, in the burner system a according to the present invention, it is preferable that: the air supply/exhaust switching device is constituted by an outer housing having two switching ports to which the air supply system and the exhaust system are always connected and an inner housing which is accommodated in the outer housing and rotatably provided; the inner housing includes a port which is provided on the rotational center thereof to be always connected to the burner, a valve seat which is brought into contact with the inner surface of the outer housing in the sliding manner to arbitrarily close the two switching ports, and a valve port which is opened on the valve seat and capable of selectively communicating with either of the two switching ports; and rotation of the inner housing establishes switching to a neutral position at which the burner is connected to either the air supply system or the exhaust system or none of them. In this case, when the burner is connected to either the air supply system or the exhaust system, the burner is determined as a burner performing combustion or a burner performing exhaust, and the state of the burner can be remained at the neutral position without passing the air or the exhaust gas through the regenerator. Therefore, in case of regenerating by flowing the exhaust gas just before the next step, the regenerative state can be maintained, and the processing can starts from the subsequent step for cooling down, i.e., the step for performing the high-temperature preheating of the air.

In addition, in the burner system according to the present invention, it is preferable that the air supply/exhaust switching device is a flapper-type three-way valve including: a housing in which a port connected to a flow passage whose flow direction is a target of switching is formed on one side while other two ports connected to flow passages in which a flow is fixed are provided on two sides which are inclined relative to the aforesaid side; a switching shaft provided at the corner between the two inclined surfaces; a flapper which is supported by the switching shaft and oscillates between the ports on the two inclined surfaces to open/close each port; and an actuator for oscillating the switching shaft. In this case, a minimum space occupied by a region in which the flapper oscillate can be formed; a purging capacity at the time of switching between air supply and exhaust can be extremely lowered; the time required for discharging the remaining exhaust gas to let the air in is shortened; and a ratio of the wasteful time in the switching time can be reduced. Further, since all the burner units achieve the alternate combustion while sequentially switching combustion and shutdown, the high-temperature combustion can be carried out with the improved temperature efficiency while reducing fluctuations in the furnace pressure.

Also, the burners in all the units perform combustion at the staggered times with the minimum purging time at the time of switching, and hence the alternate combustion can be attained forming a non-stationary flame in a wide range, resulting in facilitation of realization of the non-stationary flame and uniformity of the furnace temperature distribution.

BEST MODES FOR EMBODYING THE INVENTION

The structure of the present invention will now be described in detail in connection with the illustrative best modes thereof.

Figure 1:
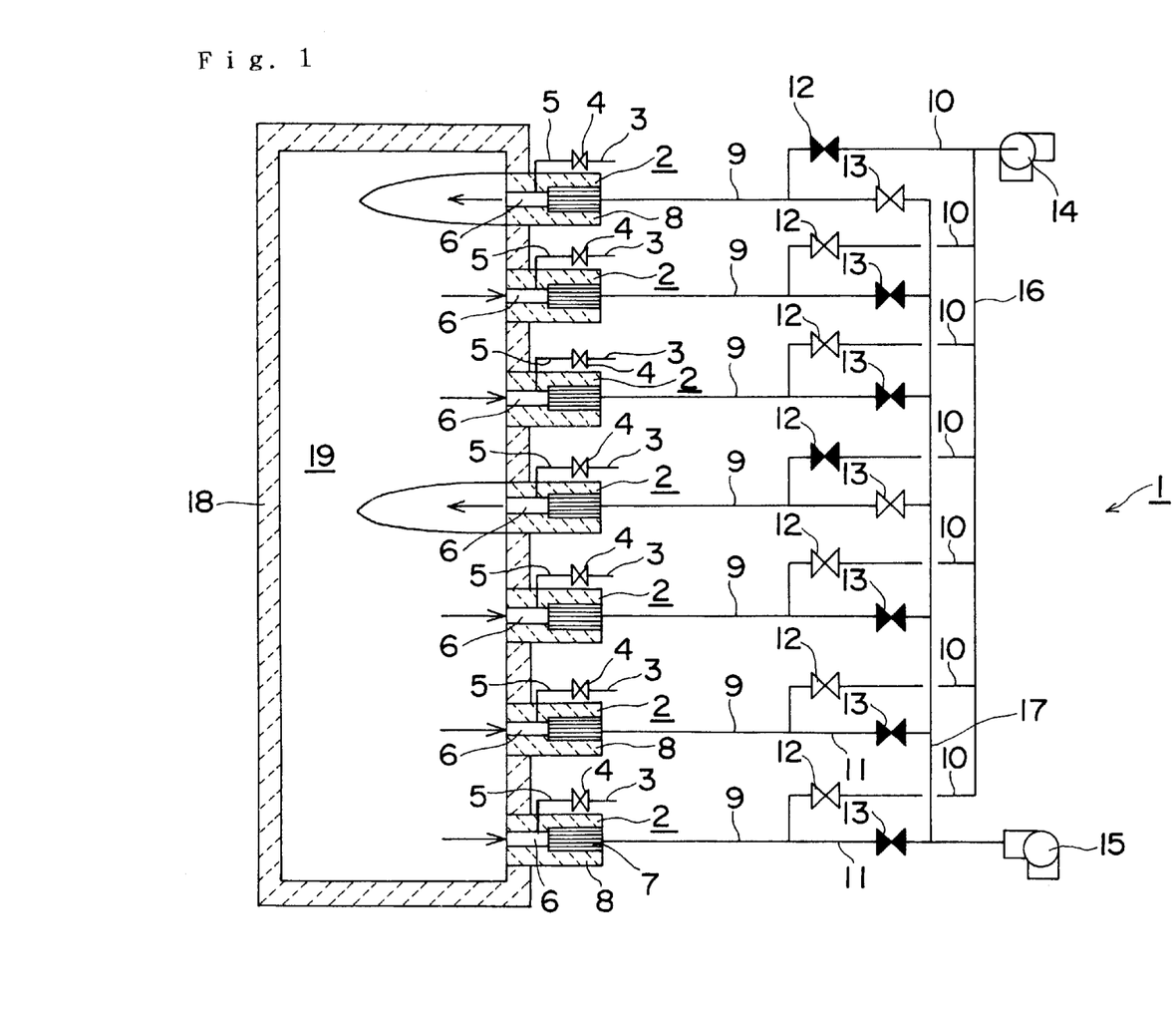
FIG. 1 is a schematic principle view showing a preferred embodiment of an alternate changeover regenerative burner system according to the present invention.

FIG. 1 shows a preferred embodiment of an alternate changeover regenerative burner system (which will be simply referred to as a burner system hereinafter) according to the present invention. With an alternate changeover regenerative burner consisting of a burner 2 having a regenerator 7 and air supply/exhaust switching devices 12 and 13 for switching connection to an air supply system and an exhaust system of the burner 2 being regarded as a module unit, the burner system 1 is constituted by three or more units, i.e., seven units. It is to be noted that reference numerals 9, 10 and 11 denote ducts and 18 designates a furnace enclosure.

This burner system 1 is composed of seven units of the alternate changeover regenerative burners 2 for realizing the so-called high-temperature combustion and a control system for appropriately selecting these units to perform combustion. The seven burners 2 independently carry out fuel injection and jet into the furnace 19 the combustion air which is preheated to have a high temperature through the regenerator 7 provided inside an air supply/exhaust throat (which will be referred to as an air throat hereunder) that is used for both supply of the combustion air and exhaust of the furnace gas. An air supply system (collective duct) 17 and an exhaust system (collective duct) 16 which are independently controllable are provided to each burner 2 so that supply of the combustion air or exhaust of the furnace gas are individually controlled. To a fuel line 3 for supplying fuel to a fuel gun 5 of each burner 2 is provided a fuel control valve 4 which is an actuator. As the fuel control valve 4, for example, an ON-OFF valve may be used or an automatic control valve may be used to perform both fuel control and ON-OFF switching. Meanwhile, either the air supply system 17 or the exhaust system 16 is selectively connected to each burner 2 in cooperation with supply of the fuel so that the burner 2 functions as a burner performing combustion when the burner 2 is connected to the air supply system 17 or the burner 2 is used as a burner performing exhaust without performing combustion and the air throat 6 functions as a part of the exhaust passage for exhausting the furnace gas when the burner 2 is connected to the exhaust system 16. Each fuel control valve 4 and the air supply/exhaust switching device for switching the air supply system 17 and the exhaust system 16, e.g., solenoid valves 12 and 13 are individually opened/closed by, for example, a non-illustrated controller. It is to be noted that the regenerator 7 provided inside the air throat 6 of each burner 2 is not restricted to specific composition and structure but use of a ceramic regenerator having a honey-comb structure is preferable.

Incidentally, this heating control is executed by the sequence control or the computer control using the controller as a part of the automatic combustion control system such as PID control or fuzzy control, and a deviation from a target value (temperature) or a combustion quantity associated with the deviation have been already determined by the automatic combustion control executed by the non-illustrated controller adopting such as a PID control system or a fuzzy control system. Therefore, the above-described heating/combustion is executed by determining a burner, by which a combustion quantity and the like set by the automatic combustion control system such as the PID control system or the fuzzy control system are attained, by the combustion. The controller operates each fuel control valve 4 based on these set values and further operates the solenoid value 13 of the air supply system 17 and the solenoid valve 12 of the exhaust system 16 in cooperation with each fuel control valve 4.

Although not illustrated, the controller is a control means for selecting and switching the burner performing combustion and that performing exhaust in a short period of time in accordance with a predetermined procedure and constituted by, e.g., a programmable controller for executing the sequence control or a microcomputer-controlled controller including at least one central processing unit, a ROM for storing a program, an interface and others. In this embodiment, the programmable controller is adopted. That is, the control system composed of the controller selectively connects the burner 2 to either the exhaust system 16 or the air supply system 17 so that the burner 2 functions as the burner performing combustion or the burner performing exhaust by switching the solenoid valves 12 and 13 each of which is the air supply/exhaust switching device for each duct. Here, the controller is programmed or sequenced in such a manner that the controller controls to successively repeat alternate regenerative combustion of all the units so that a quantity of supplied combustion air is equal to a quantity of exhaust gas, with the ratio of the number of burners performing combustion and the number of burners performing exhaust being determined as variable and all the units forming no fixed pairs.

It is to be noted that oxidizer having a high enthalpy, e.g., the high-temperature combustion air belches from the air throat 6 of the burner 2 performing combustion through the regenerator 7. This combustion air is preheated to have an enthalpy which is sufficiently high for realizing the high-temperature combustion, i.e., a high temperature equal to or above a stable combustion limit temperature of the air-fuel mixture immediately before combustion, or preferably, a high temperature not less than a self-ignition temperature. Although the temperature may differ depending on kinds of fuel or densities of oxygen, the temperature is applicable to this example as long as the combustion air is preheated to a temperature not less than 800 degrees or more preferably not less than 1000 degrees. In this combustion system 1, the high-temperature combustion air is obtained by alternately passing the furnace gas and the combustion air through the regenerator 7 made of ceramics. The stable combustion limit temperature for the air-fuel mixture immediately before combustion cited herein corresponds to a blow out temperature in the normal combustion (temperature at which combustion becomes unstable and the flame is blown out due to a value of the air ratio or a slight change and the like in the air flow rate and the like), and it is such a temperature as that the reduction in temperature far below this stable combustion limit temperature does not result in blow out because of the high-temperature air but leads to a difficulty of complete combustion involving CO components in the final exhaust gas density composition, thereby causing sudden instability of combustion.

The burner 2 of each unit (this will be referred to as a burner on the high-temperature combustion side) realizes the high-temperature combustion by using the combustion air preheated to a temperature approximating a self-ignition temperature of the air having a high enthalpy as oxidizer, i.e., the air-fuel mixture or a higher temperature (for example, 800 to 1000 degrees or a higher temperature). Therefore, the regenerator 7 filled in a casing and the like is provided to the interior of the air throat (a rear portion of the burner to which the combustion air is led) 6 in this burner 2. A structure and a material by which the pressure loss is relatively low but the thermal capacity and the durability are high, for example, a honey-comb-shaped ceramic tubular body having multiple cell holes may be preferably used for the regenerator 7. For instance, in case of heat exchange performed with respect to a high-temperature fluid like exhaust gas of approximately 1000 degrees, it may be preferable to use a honey-comb-shaped regenerator produced by extrusion molding using ceramic material such as cordierite or mullite. Alternatively, the regenerator 7 may be manufactured by using an $Al_2O_3$—Al compound material, an SiC—$Al_2O_3$—Al compound material and the like produced by spontaneously infiltrating fused metal in pores of ceramics other than cordierite and mullite, e.g., any material other than alumina or ceramics such as metal like heat-resisting steel and the like or a compound material made from metal and ceramics other than cordierite and mullite such as ceramics having a porous structure and partially oxidizing or nitriding that metal to obtain ceramics so that the pores are completely filled. It is to be noted that the honey-comb shape includes a shape to which square and triangular cells, as well as conventional hexagonal cells, are innumerably formed. In addition, the honey-comb-shaped regenerator may be obtained by bundling tubes and the like without integral molding. However, the structure of the regenerator 7 is not restricted to the honey-comb shape, and it may be obtained by radializing tabular or corrugated regenerative material in the cylindrical casing or filling tubular regenerative material in the cylindrical casing so that the fluid can flow along the axial direction. Furthermore, the regenerator 7 may be constituted by preparing a cylindrical casing which is divided into two chambers by a partition in the circumferential direction so that the fluid can flow along the axial direction and filling an agglomerate of spherical, short-tubular, short-rod, crumbling, nugget-shaped or reticulated regenerative material in each chamber. It is to be noted that the regenerator 7 is provided on the interior of the cylinder of refractory material forming each burner 2, but it is not limited thereto and may be filled in the casing and the like to be provided in the duct 9.

Incidentally, as shown in FIG. 1, although the burners 2 are linearly arranged at predetermined intervals, they are not restricted to such an arrangement and they may be arranged in the staggered manner or placed all over on the entire surface.

The combustion of the burner system 1 having the above-described structure is controlled as follows. For example, description will be given as to an application where the burner system according to the embodiment shown in FIG. 1 is installed in an industrial furnace in which re-increasing of the temperature is relatively-often observed.

Firstly, when increasing the temperature, half or more of the seven units of the burner 2 constituting one burner system is used as the burners performing combustion and the remaining is used as the burners performing exhaust, and all the units successively repeat the alternate regenerative combustion with the units forming no fixed pairs. Here, the quantity of combustion of the burner 2 is restricted by a fuel supplying mechanism (a fuel nozzle or a primary combustion chamber) and a capacity of the regenerator, the resistance (the pressure loss) of the regenerator can be reduced to supply more combustion air (for example, approximately 200% to the supplied amount after the temperature-up) with the sufficient exhaust capability (for example, approximately 200% to the exhausted amount after the temperature-up) at the time of cold start (temperature-up). However, the fuel supplying mechanism remains the same state during and after the temperature-up. Accordingly, although depending on a designed capacity of an blower or an exhauster, it is most rational to increase the temperature by using the four burners performing combustion and the three burners performing exhaust and operate by using the two burners performing combustion and the five burners performing exhaust after increasing the temperature. The burners performing combustion and those performing exhaust are selected when switching the burners in accordance with such a rule that the exhaust step must follow the regenerative step. For example, in the seven units A, B, C, D, E, F and G, the four units A, B, C and D are first used as burners performing combustion and the remaining units E, F and G are used as burners performing exhaust. After a predetermined switching time, the four units B, C, D and E function as the burners performing combustion, and the remaining three units F, G and A function as burners performing exhaust. In this manner, all the units successively repeat the alternate regenerative combustion with the units forming no fixed pairs by staggering the four units serving as burners performing combustion one by one. Although the all amount of exhaust may be discharged from the burners performing exhaust, the exhaust gas can be partially taken outside the furnace directly without using the burners performing exhaust and mixed with the exhaust gas having been cooled down through the regenerator of the burners performing exhaust to be then emitted. For example, assuming that the combustion air is 1, the exhaust gas having the amount of exhaust being in the range of 1.2 to 0.6 is distributed from a plurality of burners performing exhaust and discharged. The amount of exhaust 1.2 is such a ratio as that the exhaust can be practically effected in the regenerative burner and the amount of exhaust 0.6 is a meaningful limit in waste heat recollection. Of course, it is also possible to increase the ratio of the burner performing combustion at the time of temperature-up to improve the amount of combustion and the speed of temperature-up.

When the temperature approximates a set temperature, reduction in the number of burners performing combustion is carried out to decrease the amount of combustion (operating with the amount of combustion lower than the burner capacity in cases where all the units form pairs) to perform alternate regenerative combustion. The number of burners performing combustion is determined as, e.g., two to carry out the operation. Here, the remaining five units serve as the burners performing exhaust. In this connection, if the regenerator 7 performs heating, it is preferable that the regenerators 7 partially stop exhaust to maintain the regenerating state. For example, in the burners 2 of the seven units, when the burners 2 of the two units carry out combustion, the burners 2 of the four units can exhaust whilst the burner 2 of the one unit can be stopped. Use of the air supply/exhaust switching device shown in FIGS. 4 to 6 can obtain the neutral state to readily stop the burner 2. Consequently, the regenerator 7 can be prevented from being over-heated while maintaining the regenerating state. Further, the process can advance to the air supply step in this state.

In addition, although reduction in the amount of combustion can minify the amount of air supply, the velocity of air when operating using two burners is higher than that when operating using four burners, thus maintaining thee high velocity of combustion air belching from the burners performing combustion. Therefore, even if the amount of combustion is lowered, circulation of the combustion gas in the combustion chamber is active and well agitated to smooth a temperature in the combustion chamber. Also, the amount of combustion gas associated with a flow of combustion air is increased to greatly reduce the oxygen density in the air-fuel mixture. Accordingly, the amount of NOx is diluted with the low-$O_2$ atmosphere in the furnace and can be maintained low. Further, as different from the case where the burners are partially thinned, the burners of the all units perform combustion at the staggered times, and hence the non-stationary flame formed in a wide range, e.g., the entire area in the furnace can uniform the temperature in the furnace. At the same time, the continuous or intermittent flow of the cooling fluid through the pilot or the fuel nozzle hardly generates the overheat burnout. Here, although a method for adjusting a ratio of the burners performing combustion and those performing exhaust is not restricted to a specific type, assuming that one cycle from the start of combustion to an end of exhaust is 60 seconds for example, the ratio of combustion/exhaust may be changed as 10/50, 30/30 and 50/10 seconds, or it may be changed as 10/10, 10/30 and 10/50 seconds with the combustion time being determined as fixed.

Here, the furnace gas taken out from the burner performing exhaust is subjected to heat exchange with the regenerator 7 when passing through that regenerator 7 and cooled down to a low temperature, e.g., approximately 400 degrees at which at least a high-temperature air exhaust fan 14 or a valve can sustain, or more preferably, not more than 200 degrees to be thereafter emitted in the air and the like. Thus, damages caused due to heat that the exhaust fan and others suffer can be alleviated. Additionally, in the burner performing combustion, the combustion air sent from an air supply fan 15 is subjected to heat exchange with the regenerator 7 and preheated to a high temperature to be thereafter belched out. Also, this air has a high temperature not less than a self-ignition temperature of the fuel or the air-fuel mixture. Therefore, the flame can not be blown out even though the air is emitted into the furnace 19 at high speed. Accordingly, the combustion air is combustible even if it is belched at a flow rate of not less than 60 m/s or more preferably 60 to 120 m/s in, for example, the rated operation combustion. This causes circulation of the combustion gas in the furnace 19 to be active and well agitated so that the temperature in the furnace is smoothed and the amount of the combustion gas associated with a flow of the combustion air is increased to greatly reduce the oxygen density of air-fuel mixture. An oxidative exothermal reaction starts at an extremely-low speed everywhere in the furnace 19 at which the combustion air having a high temperature not less than the self-ignition temperature of the air-fuel mixture and the low oxygen density is brought into contact with the fuel. In addition, since the burners of the all units perform combustion at staggered times, the flow of the combustion gas varies in a short period of time to form a non-stationary flame, thereby uniformizing and smoothing the temperature field in the furnace. Therefore, the entire area in the furnace 19 is caused to have a uniform temperature, and any local area having a high temperature is not generated. Accordingly, uniform heating is possible without biased heating to a workpiece, and generation of NOx is also suppressed. In this manner, the burner capacity is effectively used to rapidly increase the furnace temperature.

The burner system according to the present invention is not restricted to the above-described example, and a ratio of the number of burners performing combustion and that of burners being stopped may be variable in accordance with the temperature-up operation for increasing the temperature in the furnace and the operation after the temperature-up so that the operation after th e temperature-up can be carried out with the number of burners performing combustion being smaller than that of burners performing combustion during the warm-up operation. For example, in the burners 2 of the seven units constituting one alternate changeover regenerative burner system, three units can have burners performing combustion whilst the remaining four units can have burners performing exhaust in order that all the units successively repeat alternate regenerative combustion without the units forming fixed pairs. In other words, in the seven units A, B, C, D, E, F and G, the three units A, B and C first serve as the burners performing combustion and the remaining four units D, E, F and G serve as the burners performing exhaust. After passage of a predetermined switching time, the three units B, C and D serve as the burners combustion while the remaining four units are the burners performing exhaust. In this way, all the units sequentially repeat alternate regenerative combustion without forming fixed pairs of burners by staggering the units, which are the burners performing combustion, one by one. That is, the two (units) burners form no pairs. Here, since the relationship between an amount of air supply and an amount of exhaust does not greatly change even though the number of burners performing combustion is different from that performing exhaust, the exhaust gas generated by the burners performing combustion of the three units is emitted from the burners performing exhaust of the four units in increments of ¾, and the flow rate is fast if the air flows through the regenerator while it is slow if the exhaust gas flows through the regenerator. As to two types of heat transfer, the heat transfer for cooling is therefore better, the efficiency of the regenerator tends to be improved. In other words, there is such a tendency as that a temperature of the heating air is increased while a temperature of the exhaust is lowered. Further, since the number of burners performing exhaust is larger than that of burners performing combustion by one, during the operation for rapidly increasing the temperature as well as the rated operation, it is possible to reduce the exhaust pressure loss and the power of the exhaust blower.

Although the above has described one preferred embodiment according to the present invention, the invention is not restricted thereto and various modifications and other embodiments are possible within the true scope of the present invention. For example, description has been given mainly as to the configuration of this embodiment in which the combustion air supply system and the exhaust system are independently provided for each burner 2, but an air hole or an exhaust hole may be respectively formed in a furnace wall and the like apart from each fuel nozzle so that the combustion air preheated to a high temperature can continuously belch directly into the furnace while performing heat exchange between the exhaust gas and the air by relatively rotating the regenerator. At the same time, the furnace gas may be continuously discharged from the exhaust hole. Further, although the independent fuel control valve 4 is provided for each burner 2 to individually control combustion of each burner 2 in the above explanation, the burners 2 may be gathered into some groups in order to control combustion for each group.

Figure 2:
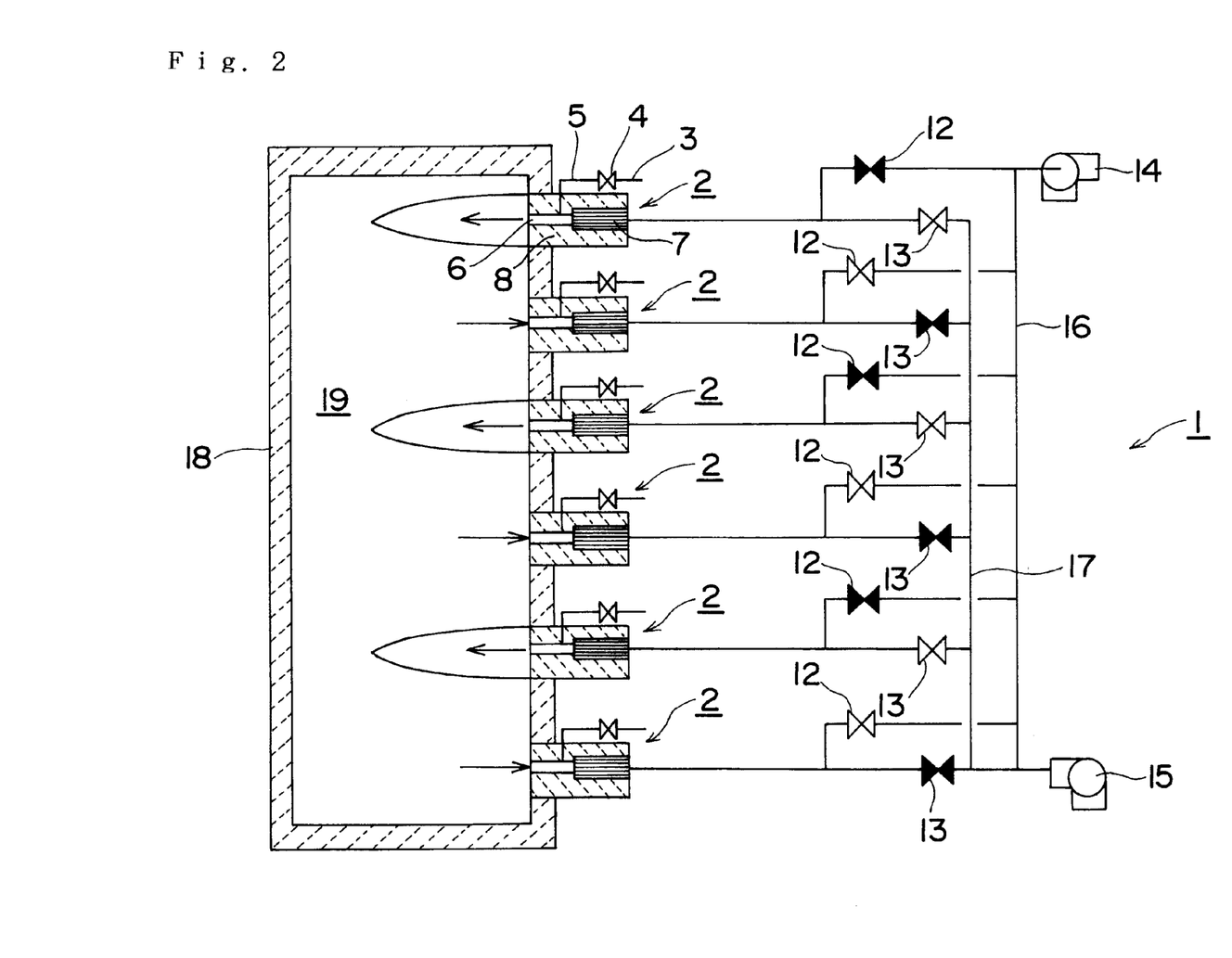
FIG. 2 is a schematic principle view of another preferred embodiment of the alternate changeover regenerative burner system according to the present invention, showing the state of combustion when rapidly increasing the temperature.
Figure 3:
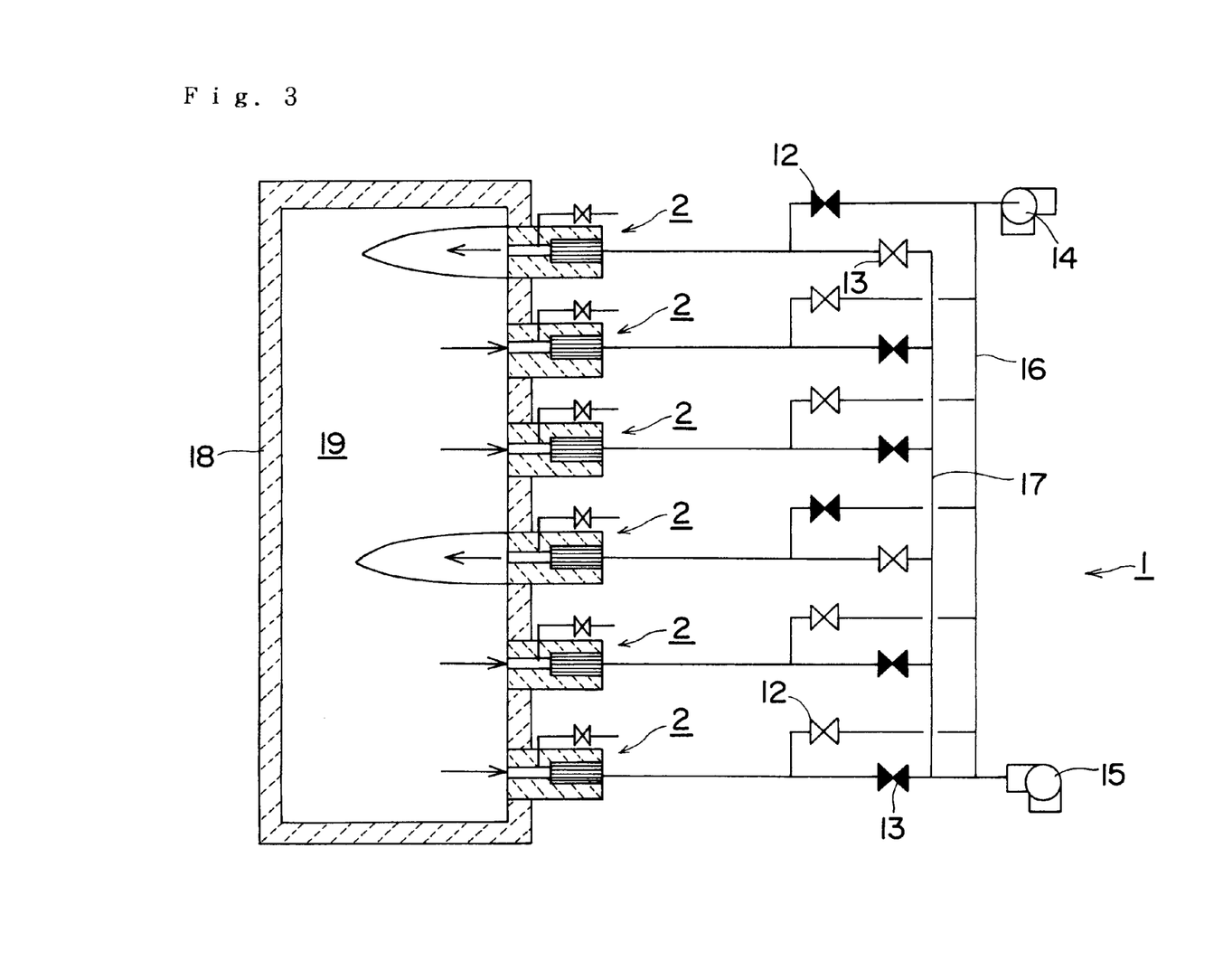
FIG. 3 is a view showing a state of combustion at the time of a rated operation of the alternate changeover regenerative burner system illustrated in FIG. 2 after the temperature-up.

Although this embodiment has been mainly described in a form of an example where an odd number of units constitute the burner system 1, the present invention is not restricted to this structure, and an even number of units, e.g., six units as shown by 31 in FIG. 2 may constitute the burner system. The burner system according to the present invention can be constituted by at least three units. When constituting the burner system by using an even number of units, an equal number of units (three units) are used to form burners performing combustion and those performing exhaust in case of rapidly increasing the furnace temperature and the like, and the number of burners performing combustion is set to be smaller than that of burners performing exhaust, e.g., two burners performing combustion and four burners performing exhaust are used to lower an amount of combustion in the operation after the temperature has been increased to a predetermined value. In such a case, the ratio of the number of the burners performing combustion to the burners performing exhaust is 1:1 in case of the temperature-up, and the pressure loss of the air and that of the exhaust are substantially equal if a quantity of flow of the air is equal to that of the exhaust. On the other hand, in the operation after the temperature has been increased, when the number of burners performing combustion is reduced to two so that the ratio of the number of burners performing combustion to that of burners performing exhaust is 1:2, since the air velocity obtained by using three burners performing combustion is higher than that obtained by using two burners performing combustion, a high velocity of the combustion air can be maintained even if an amount of combustion is reduced, and the furnace gas can be well agitated and engulfed convoluted to average the temperature in the furnace while maintaining the low NOx. In addition, as different from the case where the burners are partially thinned, all the burners carry out combustion at staggered times, and hence the temperature in the furnace can be uniformized. Moreover, continuous or intermittent flow of the cooling fluid into the pilot or the fuel nozzle can hardly generate the overheat burnout.

Additionally, each of the foregoing embodiments has been mainly described as to the mode in which a proportion of the number of burners performing combustion and the number of burners stopping combustion is variable depending on the warm-up operation for increasing a temperature in the furnace and the operation after the temperature-up and the operation after the temperature-up is carried out with the number of burners performing combustion being smaller than the number of burners performing combustion during the warm-up operation. However, the present invention is not restricted to this mode, and it can be applied to a burner system for use in a furnace in which re-increase in temperature is not often repeated or a furnace which does not require the rapid temperature-up. In such a case, a non-stationary flame obtained during the rated operation can be formed in a wade range to uniformize the furnace temperature distribution or the exhaust pressure can be reduced. For example, one system is constituted by burners of 10 units, and burners performing combustion are determined as two units while burners performing exhaust are determined as eight units so as not to form fixed pairs so that all the units sequentially perform alternate regenerative combustion by staggering the burners performing combustion and those performing exhaust. Assuming that a regenerator pressure loss of each burner unit is 40 mmAq in such a case, an air pressure loss of each burner unit is 40 mmAq and an exhaust pressure loss of the same is 10 mmAq (40×2÷8). Therefore, although a blower is generally designed with the regenerator pressure loss equal to 40 mmAq, the blower of the present invention can be designed with the regenerator pressure loss equal to 10 mmAq. Thus, the blower of exhaust can be greatly minimalized, and the exhaust can be covered by natural ventilation using a blower for air supply and an exhaust flue, thereby omitting a blower for exhaust.

Figure 4:
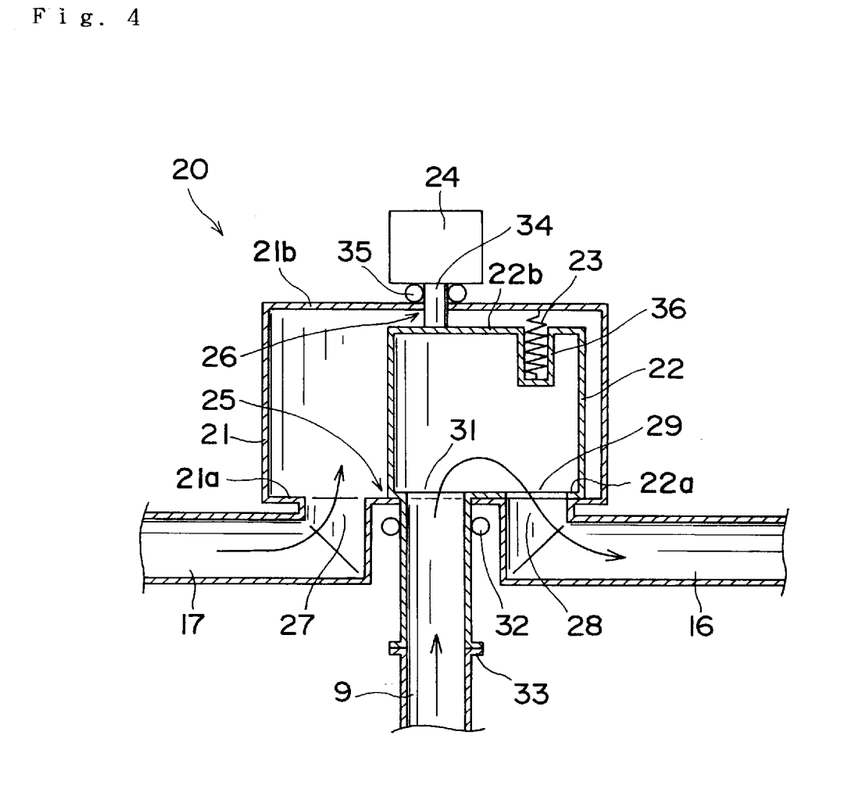
FIG. 4 is a longitudinal sectional view taken along a central line for schematically showing an air supply/exhaust switching device of the alternate changeover regenerative burner system according to yet another embodiment of the present invention.
Figure 5:
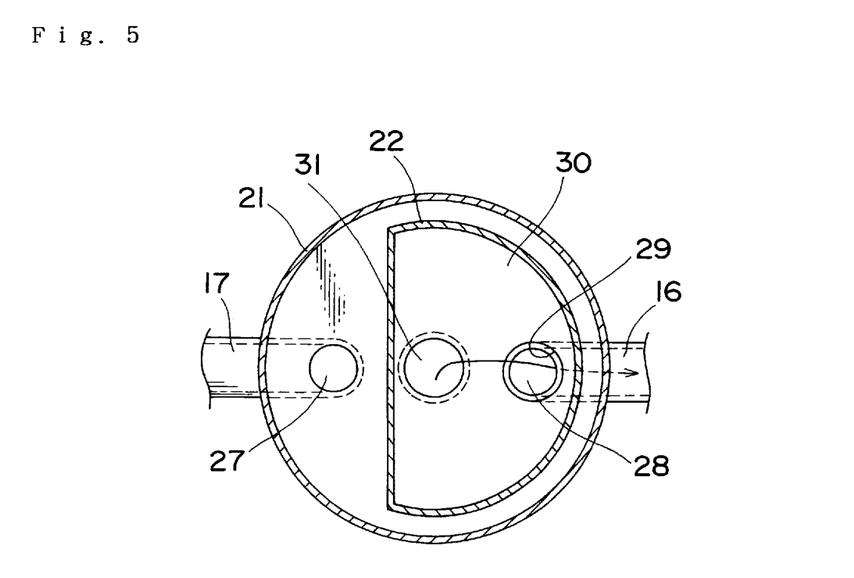
FIG. 5 is a plan cross-sectional view of the air supply/exhaust switching device in FIG. 4 which is in the communicating state.
Figure 6:
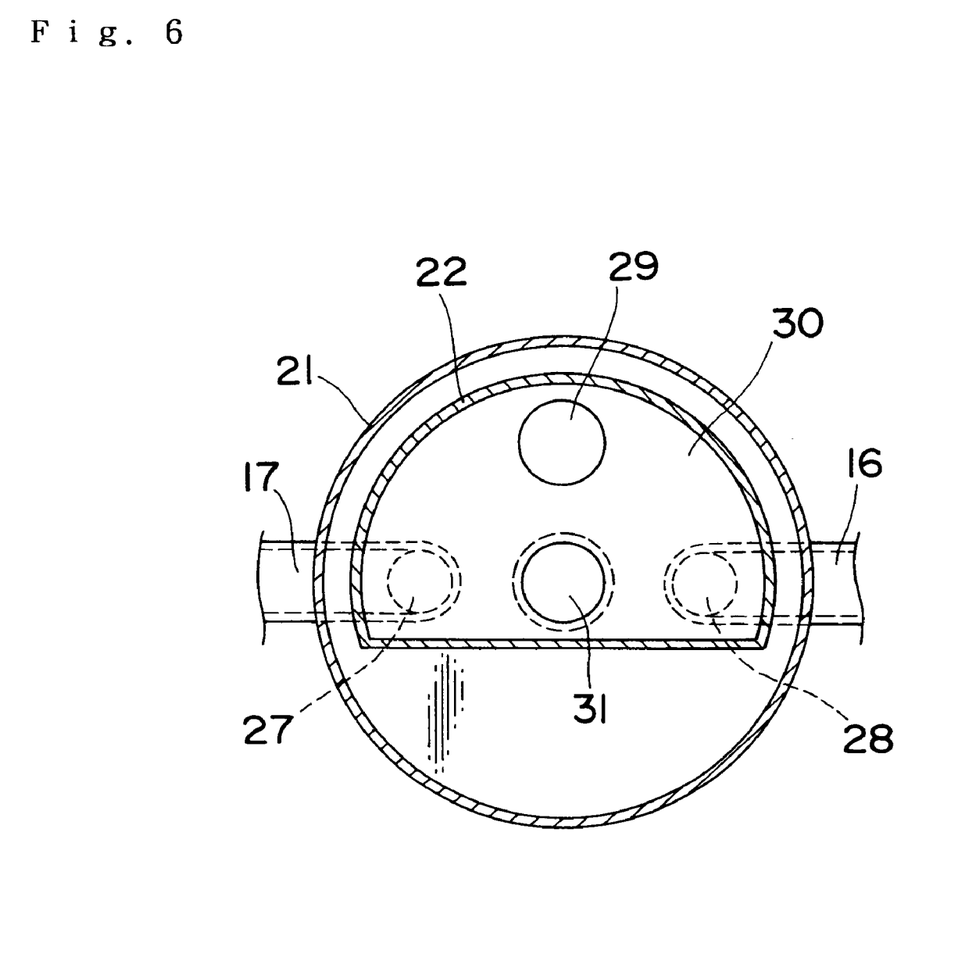
FIG. 6 is a plan cross-sectional view of the air supply/exhaust switching device in FIG. 4 which is the neutral state.

Furthermore, the air supply/exhaust switching device is not restricted to two solenoid valves 12 and 13, and it is possible to use switching means, e.g., a three-way valve having a position at which the valve is constantly connected with both the air supply system and the exhaust system, a position at which the valve is connected with either of them and a neutral position at which the valve is connected with non of them or a three-way valve having no neutral position. For example, an air supply/exhaust switching device 20 such as shown in FIGS. 4 to 6 can be used. This air supply/exhaust device 20 is constituted by: a cylindrical outer housing 21; a semi-cylindrical inner housing 22 rotatably accommodated in the outer housing 21; impetus giving means 23 for imparting impetus to the inner housing 22 in the axial direction to be pushed against the bottom surface of the outer housing 21; and a driving motor 24 for rotating or oscillating the inner housing 22.

The outer housing 21 has a substantially-cylindrical hollow body obtained by molding using a material having heat resistance and abrasion resistance, and to the nearly-central part of the opposed both end surfaces thereof, i.e., the bottom surface and the top surface 21a and 21b are formed with bearing holes 25 and 26. Further, two switching ports 27 and 28 are provided on one end surface, e.g., the bottom surface 21a. The switching port cited herein means a port whose connection with respect to the burner 2 is changed over. In addition, a fixed port means a port having the fixed connection relationship, and in this embodiment, this is a port connected to the burner. In this embodiment, the switching ports 27 and 28 have a circular shape and are symmetrically arranged at 180 degrees around the bearing hole 25. These switching ports 27 and 28 have a diameter which is substantially equal to that of a valve port 29 provided in the inner housing 22, and they can communicate with this valve port with a sufficient area. The valve port 29 is closed by a valve seat 30 when it does not communicate with any of these switching ports 27 and 28, and the valve port 29 is positioned so as not to simultaneously communicate with the both switching ports 27 and 28. Further, although not illustrated, a mechanical seal is provided on the bottom surface 21a of the outer housing 21 with which the inner housing 22 is brought into contact in order to constitute the seal with respect to the outer end surface of the inner housing 22. When the switching ports 27 and 28 or the valve port 29 and the valve seat 30 are set so as to have the above-described relationship, the shapes of the outer housing 21 and the inner housing 22 are not restricted to those mentioned above. The air supply system 17 is connected d to the switching port 27; the exhaust system 16 is connected to the switching port 28; and a duct coupled with the burner is connected to the fixed port 31.

The inner housing 22 is a semi-cylindrical body provided to the inside of the outer housing 21 so as to be capable of oscillating, and the inner housing side fixed port 31 and the valve port 29 are formed on one surface 22a thereof. The inner housing side fixed port 31 is a circular hole provided in the center of rotation of the inner housing 22, and to this inner housing side fixed port 31 is connected the duct 9 c connected to a flow passage e in which the regenerator 7 of the burner 2 is provided. This duct 9 is engaged with the bearing hole 25 of the outer housing 21 and rotatably supported by a bearing 32. Further, the duct 9 is connected with an oscillating joint 33 and the like to function as a shaft in the rotational center of the inner housing 22. Although not illustrated, a mechanical seal or the like is constituted between the bearing hole 25 and the duct 9 to assure the airtight connection. It is to be noted that the inner housing 22 may oscillate in the right-and-left direction or rotate only in one direction.

The valve port 29 is a circular port so provided as to be matched with the switching port 27 or 28 provided to the outer housing 21 in accordance with an angle of oscillation of the inner housing 22. A distance of the valve port 29 from the axis of oscillation is determined so as to be equal to that of the gas switching port 27 or 28 from the axis of oscillation, and the valve port 29 is formed in such a manner that it entirely or partially overlaps on the switching port 27 or 28 by rotation of the inner housing 22.

The surface 22a of the inner housing 22, on which the inner housing side fixed port 31 or the valve pot 29 is formed as described above, is flat and has a valve seat 30 which can close the switching port 27 or 28. When the valve port 29 communicates with one switching port, e.g., the switching port 28 as shown in FIG. 4, the valve seat 30 does not close or partially overlap on the other switching port 27 to sufficiently assure the fluid passage. In this communicating state, when the inner housing 22 swivels, a portion where the valve port 29 is matched with the switching port 28 is reduced and eventually becomes zero and, at this time, the switching port 28 is closed by the valve seat 30. In this manner, the valve seat 30 is provided in such a manner that either or both of the switching ports are closed by the valve seat 30 when the valve port 29 does not communicate with any of the switching ports. It is to be noted that the inner housing 22 has a substantially-semi-cylindrical shape in this embodiment but it may have any other shape as long as it has the inner housing side fixed port 31 and the duct 9 as well as the valve port 29 and the valve seat 30 having the above-described relationship. For example, the valve seat 30 may have a sector form so as to closer only one switching port in the middle of switching process. In this case, since one switching port is released before the other switching port communicates with the valve port, the timing of flows of two types of fluid can be staggered.

The inner housing 22 is rotatably supported in the outer housing 21 by the above-described duct 9 and a rotating shaft 34. The rotating shaft 34 is provided on the surface 22b opposed to the side to which the inner housing side fixed port 31 of the inner housing 22 is formed in such a manner that the center of oscillation of the rotating shaft 34 becomes equal to the same of the duct 9, and the rotating shaft 34 is supported by the bearing 35. This shaft 34 airtightly comes into contact with the bearing hole 26 by using a seal and the like.

Further, an impetus is given to the inner housing 22 by the impetus giving means 23 in a direction along which the inner housing 22 is pushed against the surface on which the switching ports 27 and 28 of the outer housing 21 are formed, i.e., the bottom surface 21a, thereby obtaining the airtightness. Consequently, the switching port is airtightly closed and simultaneous closure of the two flow passages, i.e., the air supply system and the exhaust system can be assured. Therefore, the gas hardly leaks from the surface with which the port comes into contact and, even if the inner housing repeatedly oscillates to grind down the contact surface, the wear can be automatically supplemented. The impetus giving means 23 is provided between the top surface 21b of the outer housing 21 and one surface 22b of the inner housing 22 and pushes the valve seat 30 against the switching ports 27 and 28 in the airtight fashion. In this embodiment, a compressed coil spring is used as the impetus giving means 23. When the impetus giving means 23 is so provided as to be positioned substantially-right above the valve port 29, the valve port 29 can be uniformly pushed against the switching ports 27 and 28 in the airtight manner. Here, when a spring accommodating concave portion 36 which is recessed in the inner housing 22 is provided on the upper portion of the inner housing 22 so that the impetus giving means 23 is set in the concave portion 36 in the axial direction, it is preferable that the spring is cooled down by the fluid on the low-temperature side led in the inner housing 22. Moreover, when the upper end portion of the impetus giving means 23 is received by a non-illustrated rolling body such as a ball, the impetus giving means 23 can smoothly follow the oscillating inner housing 22. It is to be noted that the impetus can be also given by the weight of the inner housing 22 itself in place of providing the impetus imparting means 23.

A driving motor 24 is provided outside the outer housing 21 and swivels the inner housing 22 through a shaft 34. For example, when a stepping motor is used as the motor 24, positioning can be performed with high accuracy.

According to the air supply/exhaust switching device having the above-mentioned arrangement, when the valve port 29 communicates with one switching port 28 as shown in FIG. 4, the other switching port 27 is released from the valve seat 30 and is not thus closed. Therefore, this switching port 27 is closed by the outer housing 21. As a result, the exhaust gas flows inside the inner housing 22. Further, the inner housing 22 is rotated at 180 degrees by the driving motor 24 so that the valve port 29 communicates with the switching port 27, the exhaust system 16 is blocked off in turn and the combustion air flows inside the inner housing 22.

Additionally, as shown in FIG. 6, when the valve port 29 is set at the neutral position and does not communicate with any of the switching ports, both of the switching ports 27 and 28 are closed by the valve seat 30 and the exhaust system 16 and the air supply system 17 are blocked off from the burner 2. In this neutral position, neither the air nor the exhaust gas flows through the regenerator 7 and this state is maintained. Therefore, when heat is reserved by flowing the exhaust gas immediately before the next step, that heat reserving state can be maintained, and it is possible to start from the process for cooling down that state, i.e., the process for preheating the air at a high temperature. Further, a flow of the fluid can be interrupted without changing a pressure to the fluid or without stopping the fluid in the middle of the process.

When the inner housing 22 is further swiveled in the counterclockwise direction in the drawing, the valve seat 30 is removed from the top of the switching port 28 so that the switching port 28 can be released. That is, the switching port 28 is closed by the outer housing 21 to block off the exhaust system 16. When the inner housing 22 further rotates, the switching port 27 overlaps on the valve port 29, and the fixed port 31 of the inner housing 22 communicates with the switching port 27 through the inner housing 22, thereby connecting the air supply system 17 to the burner 2. Incidentally, although the flow passage can be satisfactorily switched by closing at least one switching port by the valve seat 30, both of the switching ports 27 and 28 can intentionally be simultaneously closed in this embodiment.

When the switching ports 27 and 28 are simultaneously closed by the valve seat 30 of the inner housing 22 (the state shown in FIG. 6), supply of the combustion air is suspended to stop combustion of the burner 2 and a flow of the exhaust gas is also stopped, thus suppressing the overheat of the regenerator 7. At this time, the impetus is given to the inner housing 22 in such a manner that the inner housing 22 is pressed against the valve seat 30 by the impetus giving means 23 in the axial direction, and a flow of the combustion air or the exhaust gas can be hence interrupted. Therefore, the interval control for adjusting a temperature of the burner 2 or the regenerator 7 can be carried out by appropriately adjusting a time for closing the switching ports 27 and 28 and the valve port 29.

If this switching means is used, the communicating state and the closing state can be easily changed over by rotating the inner housing 22. Further, escape of gas (leak) hardly occurs because the surface sliding type sealing is adopted. Therefore, when this device is applied to, for example, a burner system, the combustion air can not leak to the flow passage side of the exhaust gas, and the combustion air ratio can be accurately controlled. Additionally, since the overlap of the switching ports 27 and 28 and the valve port 29 is used to change over the flow passage by rotating the inner housing 22, it is possible to reduce or eliminate the shock due to a change in flow when switching the flow passage. Accordingly, a large fluctuation of the furnace pressure and the like can be prevented from being generated when switching the burner.

Figure 7:
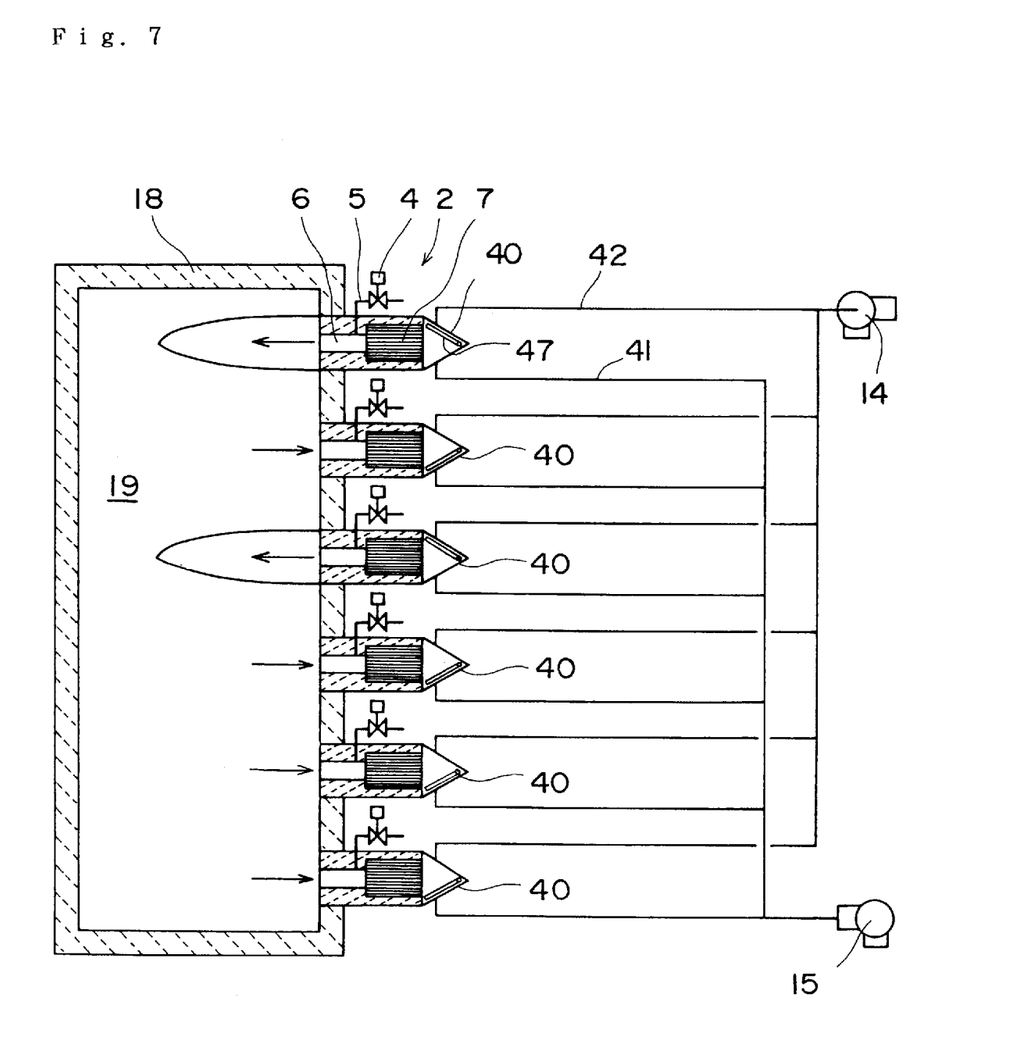
FIG. 7 is a schematic principle view showing a further embodiment of the alternate changeover regenerative burner system.
Figure 8:
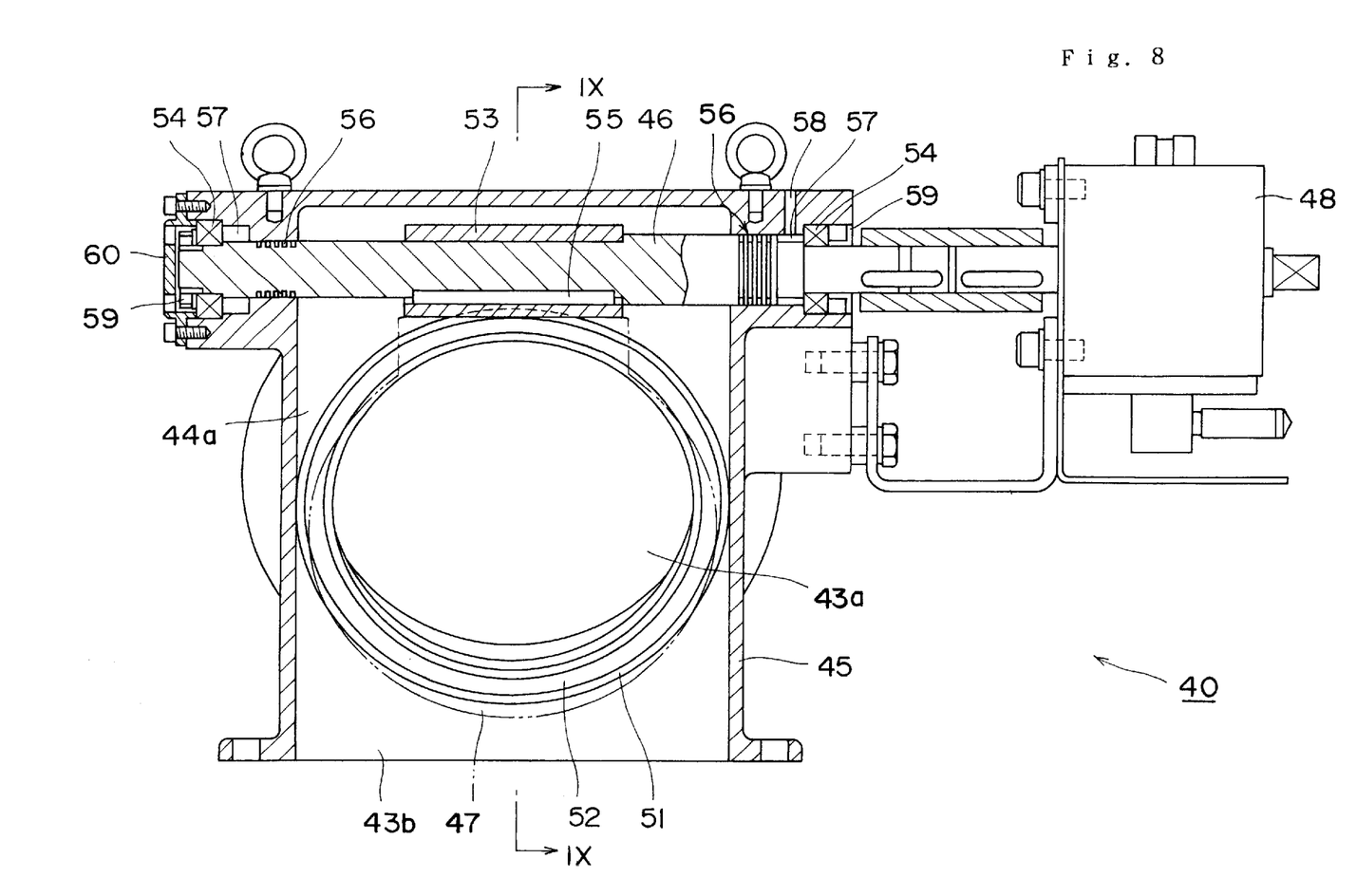
FIG. 8 is a longitudinal sectional view of the air supply/exhaust switching device used in the burner system depicted in FIG. 7.
Figure 9:
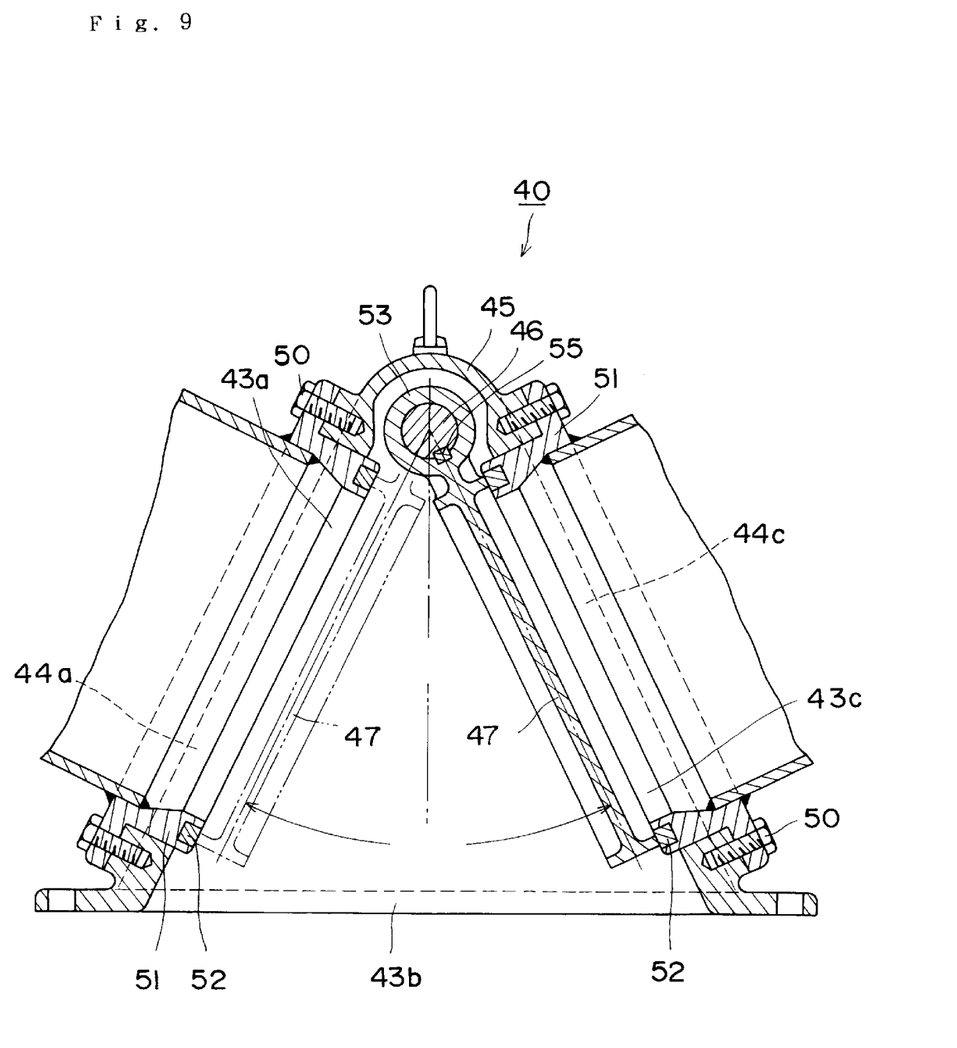
FIG. 9 is a sectional view taken along the IX—IX line in FIG. 8.

Moreover, it is preferable that the burner system 1 according to the present invention adopts a flapper-type three-way valve 40 such as shown in FIGS. 7 to 9 as the air supply/ exhaust switching device so that this valve 40 is directly connected to the rear end of the burner body having the regenerator therein. This flapper-type three-way valve 40 connects the air supply system 41 to one port and connects the exhaust system 42 to the other port. In addition, the respective ducts 41 and 42 are arranged into one duct by a manifold to be connected to the exhaust fan 14 and the air supply fan 15, respectively.

The burner body cited herein means a member including a casing and flange attached to the furnace 18 as well as a refractory insulating block constituting the air throat 6 equipped with the regenerator 7 and a burner tile or a wind box in some cases, and the burner body constitutes at least one combustion unit composed of a fuel nozzle, and the burner 2 as one unit. It is to be noted that the combustion unit is provided in parallel with the air throat 6 to directly inject the fuel into the furnace 19. In this case, since the fuel and the combustion air having a high temperature are slowly mixed in the furnace 19, which contributes to reduction in NOx.

As shown in FIGS. 8 and 9, the flapper-type three-way valve 40 is constituted by: a housing 45 obtained by providing two ports 43a and 43c on two oblique planes 44a and 44c inclined with respect to the other port 43b directly connected to the burner body; a switching shaft 46 provided at the corner between the two oblique planes 44a and 44c; a flapper 47 which is supported by the switching shaft 46 and oscillates between the two oblique planes 44a and 44c to open and close the respective ports 43a and 43c; and an actuator 48 which causes the switching shaft 46 to oscillate within a predetermined angle. A valve seat of the housing 45 to which the port 43b is formed is fixed to the burner body by a bolt and the like. Further, each of the ports 43a and 43c is formed by a cylindrical valve seat member 51 which is fitted into each hole on the oblique planes 44a and 44c of the housing 45 and fixed by a bolt 50. A valve seat opposed to the flapper 47 of the valve seat member 51 is made up of an annular packing 52 which is pressed into and fixed in a reverse-tapered groove. The valve seat member 51 is detachably fixed from the outside of the housing 45 by bringing the flange portion into contact with the outside of the housing 45 to be fixed by the bolt 50. The flapper 47 is constituted by a circular plate having on the periphery thereof an annular flange having a diameter equal to that of the packing 52. A boss portion 53 in the base end portion of the flapper 47 is fixed to the switching shaft 46 which is rotatably supported by the housing 45 through the bearing 54 and rotates in the right and left direction at each small angle, e.g., 26 degrees. Here, the oscillation angle of the flapper 47 is set to a value such that the flapper 47 can be slightly pushed against the packing 52 even after the flapper 47 has come into contact with the packing 52 and the leak is controlled to be an extremely-small value by elastically deforming the packing 52 to provide sealing. Here, a position of the flapper 47 is detected by a non-illustrated proximity switch and fed back to be used for control.

The switching shaft 46 is constituted by hardened steel which has been subjected to the hardening and tempering process and fixed by utilizing the flapper 47 and a connecting key 55. Further, to the switching shaft 46 is provided with a labyrinth 56 in a region close to the inside from the bearing 54. That is, the bearing 54 and the space in the valve are partitioned by the labyrinth seal 56. Moreover, a space 57 communicating with the outside of the housing and a communicating hole 58 are formed between the labyrinth 56 and the bearing 54 so that the exhaust leaking from the space in the valve is emitted to the outside of the housing without passing through the bearing 54. Therefore, since the bearing 54 is not directly heated by the exhaust gas, a temperature of the bearing 54 reaches only approximately 100 degrees even if the bearing 54 is heated to a certain degree by the heat of the exhaust gas transferred through the switching shaft 46. Thus, a problem concerning retention of hardness of the bearing 54 is eliminated. Incidentally, in reference numerals in the drawing, 59 denotes a fixing member such as a collar or a lockup nut and 60 designates an oil cover with a filler which has a oil sump structure with a filler capable of greasing up from the outside so that it is possible to change grease degenerated due to high temperature. Further, since the oil cover has the bearing structure capable of greasing up from the outside, a problem of degeneration change in quality of the grease can be eliminated by periodically replacing the grease.

Since the flapper-type three-way valve 40 having the above-described arrangement is composed of a minimum space taken up by a range in which the flapper 47 oscillates, the volumetric capacity of purging performed when changing over the air supply and the exhaust can be extremely reduced, and the time required for changing the air for the remaining exhaust gas is shortened to decrease a proportion of the wasteful time in the changeover time. Only an extremely short purging time is taken in the changeover time (for example, the purging time of not more than 0.3 second from extinction of flame to ignition) and it is determined that ignition is carried out at the same moment that extinction of flame is performed. Moreover, since all the burner units establish alternate combustion while sequentially changing over combustion and shutdown, the high-temperature combustion with the improved temperature efficiency can be carried out with the reduced fluctuation of the furnace pressure. According to the burner system of the present invention, since the air throat 6 of the burner body is directly connected with the flapper-type three-way valve 40, the unnecessary purging capacity corresponding to the capacity of a duct between the burner body 2 and the three-way valve 40 which is the air supply/exhaust switching device can reduce the purging capacity, and the time required for changing the air for the remaining exhaust gas can be shortened, thus enabling the high-speed switching. Therefore, ignition can be carried out at the same moment that extinction of flame is performed. This can suppress the fluctuation of the furnace pressure. According to the experiment performed by the present inventor, when the burner system according to the present invention was adopted in a facility where the fluctuation of the furnace pressure of approximately 200 mmAq was observed, it was possible to suppress the fluctuation of the furnace pressure to approximately 30 mmAq. Further, since the high-speed switching can be effected, the temperature efficiency can be improved to obtain the preheating air having a higher temperature, thereby realizing the high-temperature air combustion.

In this case, since the burners in all the units stagger the time and reduce the purging time at the time of switching as much as possible to carry out combustion, the alternate combustion can be established while forming a non-stationary flame in a wide range. Therefore, realization of the non-stationary flame can be further enhanced as compared with the alternate combustion burner system according to the embodiment shown in FIGS. 1 to 6, thus uniformizing the furnace temperature distribution.

What is claimed is:

1. An alternate changeover regenerative burner system in a burner system operating with a quantity of combustion during rated operation after increasing temperature being set to be smaller than that during warm-up operation comprising:

at least three or more units of alternate changeover regenerative burner for constituting a combustion system;

one module unit of said alternate changeover regenerative burner including a burner having a regenerator, and an air supply/exhaust switching device for switching connection to an air supply system and an exhaust system of said burner;

all of said units sequentially repeating alternate regenerative combustion with said units forming no fixed pairs;

a ratio of the number of said burners performing combustion and the number of said burners being stopped being determined to be variable depending on said warm-up operation for increasing a furnace temperature and said operation after increasing the temperature; and said operation after increasing the temperature being carried out with said burners performing combustion whose number is smaller than the number of burners performing combustion during said warm-up operation.

2. An alternate changeover regenerative burner system according to claim 1, wherein a ratio of the number of burners performing combustion and the number of burners being stopped in said combustion system is variable in accordance with a fluctuation of a quantity of combustion.

3. An alternate changeover regenerative burner system according to claim 1, wherein the number of burners performing combustion is equal to or larger than the number of burners performing exhaust during said warm-up operation and the number of burners performing exhaust is larger than the number of burners performing combustion during said rated operation after increasing the temperature.

4. An alternate changeover regenerative burner system according to claim 1, wherein a ratio of exhaust gas successively exhausted through all the units to combustion air determined as 1 is in a range of 1.2 to 0.6.

5. An alternate changeover regenerative burner system according to claim 1, wherein a part of said exhaust gas is directly taken to the outside of a furnace without passing through said burner performing exhaust and mixed with exhaust gas cooled down through said regenerator of said burner performing exhaust to be then emitted.

6. An alternate changeover regenerative burner system according to claim 1, wherein the combustion air supplied through said regenerator is preheated to a high temperature not less than at least a stable combustion limit temperature of an air-fuel mixture immediately before combustion.

7. An alternate changeover regenerative burner system according to claim 1, wherein said combustion air is injected at a flow velocity of not less than 60 m/s during rated operation combustion.

8. An alternate changeover regenerative burner system according to claim 1, wherein said air supply/exhaust switching device has a three-way valve function by which said air supply system and said exhaust system are constantly connected and a port is directly connected to each of said burner units including said regenerator.

9. An alternate changeover regenerative burner system according to claim 8, wherein said air supply/exhaust switching device includes:

a housing having two ports formed on two sides respectively, each of the ports being connected to respective flow passages whose flows are fixed, each of the sides being oblique plane with respected to a side on which another port connected to a flow passage is formed, and a flow direction of the flow passage connected with the port being switched;

a switching shaft provided at a corner between the two oblique planes;

a flapper which is supported by said switching shaft and oscillates between said two ports on said two oblique planes for opening/closing each port; and an actuator for oscillating said switching shaft.

10. An alternate changeover regenerative burner system according to claim 1, wherein said air supply/exhaust switching device comprises an inner housing and an outer housing;

said outer housing having two switching ports to which said air supply system and said exhaust system are constantly connected respectively;

said inner housing being rotatably accommodated in said outer housing; said inner housing having a port constantly connected to said burner on a center of rotation thereof, a valve seat which is brought into contact with an inner surface of said outer housing in a sliding manner to arbitrarily close said two switching ports, and a valve port which is formed on said valve seat and can selectively communicate with one of said two switching ports; and rotation of said inner housing effecting changeover to a position at which said burner is connected to either of said air supply system or said exhaust system through said outer housing or a neutral position at which said burner is connected to none of them.

11. An alternate changeover regenerative burner system according to claim 1, wherein the number of said burner units are five or more, and the number of burners performing combustion is slightly smaller than the number of burners performing exhaust during said warm-up operation while the number of burners performing combustion is greatly smaller than the number of burners performing exhaust during the rated operation after increasing the temperature.

12. An alternate changeover regenerative burner system comprising:

at least three or more units of alternate changeover regenerative burner for constituting a combustion system;

one module unit of said alternate changeover regenerative burner including a burner having a regenerator, and an air supply/exhaust switching device for switching connection to an air supply system and an exhaust system of said burner;

combustion air preheated to a high temperature not less than at least a stable combustion limit temperature of an air-fuel mixture immediately before combustion through said regenerator being supplied; and all of said units sequentially repeating alternate regenerative combustion with said units forming no fixed pairs.

13. An alternate changeover regenerative burner system according to claim 12, wherein a ratio of the number of burners performing combustion and the number of burners being stopped in said combustion system is variable in accordance with a fluctuation of a quantity of combustion.

14. An alternate changeover regenerative burner system according to claim 12, wherein a proportion of exhaust gas successively emitted through all of said units to combustion air determined as 1 is in a range of 1.2 to 0.6.

15. An alternate changeover regenerative burner system according to claim 12, wherein a part of exhaust gas is directly taken out to the outside of said furnace without passing through said burner performing exhaust and mixed with exhaust gas cooled down through said regenerator of said burner performing exhaust to be then emitted.

16. An alternate changeover regenerative burner system according to claim 12, wherein said combustion air is injected in a rated operation combustion at a flow velocity of not less than 60 m/s.

17. An alternate changeover regenerative burner system according to claim 12, wherein said air supply/exhaust switching device has a three-way valve function by which said air supply system and said exhaust system are constantly connected, and one remaining port is directly connected to each burner unit including said regenerator therein.

18. An alternate changeover regenerative burner system according to claim 12, wherein said air supply/exhaust switching device comprising: an outer housing having two switching ports to which said air supply system and said exhaust system are constantly connected; and an inner housing which is rotatably accommodated in said outer housing, said inner housing including: a port constantly connected to said burner on a center of rotation thereof; a valve seat which is brought into contact with the inner surface of said outer housing in a sliding manner to arbitrarily close said two switching ports; and a valve port which is formed on said valve seat and can selectively communicate with one of said two switching ports, rotation of said inner housing effecting changeover to a position at which said burner is connected to either of said air supply system or said exhaust system or a neutral position at which said burner is connected to none of them.

19. An alternate changeover regenerative burner system according to claim 17, wherein said air supply/exhaust switching device includes: a housing which has two ports, to which flow passages whose flows are fixed are connected, formed on two sides which are oblique with respect to a side on which a port connected to a flow passage that is a target of a flow direction changeover is formed; a switching shaft provided at a corner between the two oblique planes; a flapper which is supported by said switching shaft and oscillates between said two ports on said two oblique planes for opening/closing each port; and an actuator for oscillating said switching shaft.

* * * * *